W. H. WALKER.
EMPLOYMENT CALENDAR CARD SYSTEM.
APPLICATION FILED JULY 25, 1912.
1,047,467.
Patented Dec. 17, 1912.
2 SHEETS—SHEET 1.
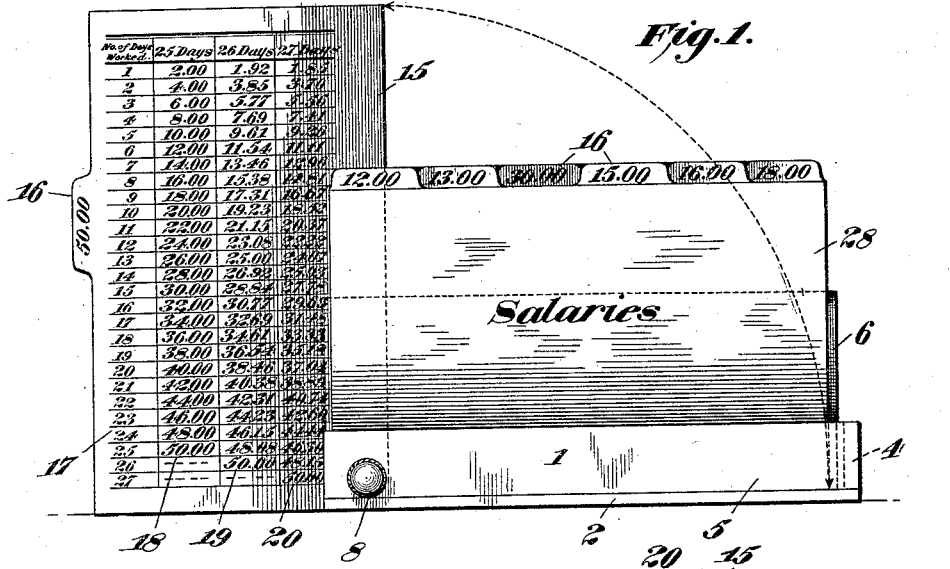
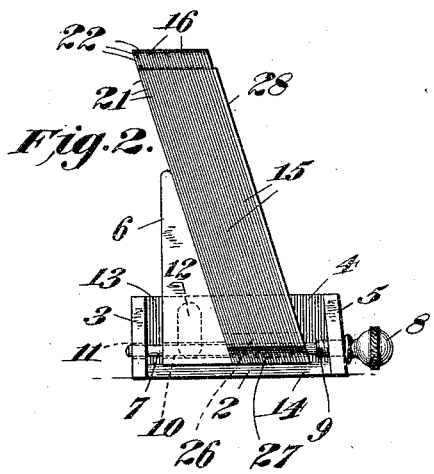
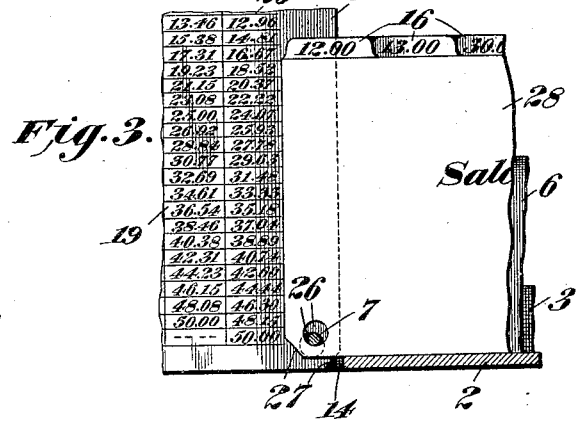
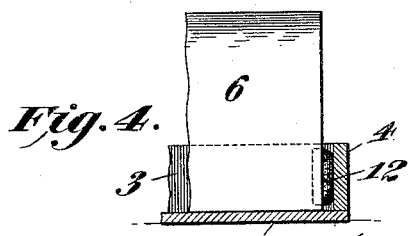
WITNESSES,
Elmer Leavey
J. F. Grogan
INVENTOR.
William H. Walker
by Geo. E. Thackray
his ATTORNEY.

W. H. WALKER.
EMPLOYMENT CALENDAR CARD SYSTEM.
APPLICATION FILED JULY 25, 1912.

1,047,467.

Patented Dec. 17, 1912.
2 SHEETS—SHEET 2.

UNITED STATES PATENT OFFICE.

WILLIAM H. WALKER, OF JOHNSTOWN, PENNSYLVANIA.

EMPLOYMENT-CALENDAR-CARD SYSTEM.

1,047,467.

Specification of Letters Patent.

Patented Dec. 17, 1912.

Application filed July 25, 1912. Serial No. 711,459.

*To all whom it may concern:*

Be it known that I, WILLIAM H. WALKER, a citizen of the United States, residing in the city of Johnstown, in the county of Cambria and State of Pennsylvania, have invented certain new and useful Improvements in Employment-Calendar-Card Systems; and I do hereby declare the following to be a full, clear, and exact description of the invention, such as will enable others skilled in the art to which it appertains to make and use the same.

My invention relates to a card receptacle and system which, by virtue of its construction in combination with the form and arrangement of the cards, facilitates the exposure of any desired card for reference thereto, and permits its return to its concealed position within the receptacle without disarranging or unduly disturbing the other cards.

With these objects in view the invention comprises certain novel constructions, combinations and arrangements of parts as will be hereinafter more fully described and pointed out in the appended claims.

Referring now to the accompanying two sheets of drawings forming part of this specification: Figure 1 is a front elevation of my card system and file case, one card of which appears rotated to its position for inspection. Fig. 2 is an end elevation of my invention illustrating the open side end of the file case, the follower block supporting the cards and the means whereby the cards are secured and pivoted within the file case. Fig. 3 is a detail view of a portion of my improved device showing the perforated corner edge of the card through which the pivotal pin or retaining rod passes and the relative position assumed by the card perforation with respect to the extreme limits of the cards rotating motion, the file receptacle being shown in section. Fig. 4 is a longitudinal sectional elevation of a portion of the card file case illustrating the friction member attached to the follower block and bearing against the closed side end of the file case. Fig. 5 illustrates one of the monthly salary cards with tabulated amounts indicated individually and collectively thereon for all the working days in a month at a certain monthly salary. Fig. 6 illustrates one of the employment cards upon which is indicated for four months, under the proper headings, the number of working days an employee may work in each month or fraction thereof.

In the drawings, in which like characters of reference designate corresponding parts throughout the several views: 1 indicates the file case for retaining the cards, comprising a bottom 2 with a vertical upwardly extending side 3 and end 4; also a front slightly inclined side 5. A follower block 6 with an inclined face is located within the file case upon which the cards normally lean for support to prevent them from falling over and to hold them in position for inspection.

The retaining rod 7 has a knob 8 on one end and an intermediate upset threaded portion 9 back of said knob 8 by means of which it is screwed into one end of the inclined front side 5 of the file case. The rod 7 thence passes rearwardly through the perforations 10 and 11 in the follower block 6 and the rear side 3 of the file case. The follower block 6 is retained in the position desired by the combined action of the retaining rod 7 at one end of the file case and the friction member 12 which may be of rubber or any other suitable elastic and frictional material attached to the opposite end of the follower block and contacting with the inner side of the end 4 of the file case.

One end of the file case nearest the retaining rod 7 is left open as at 13 and the bottom 2 does not extend to the end of the case at this end, but stops short as indicated at 14 to enable the cards which are pivoted on the retaining rod 7 to be rotated a quarter turn.

15 indicates the monthly salary cards, each having a tab 16 formed integral therewith or attached to each card at a desired point preferably in staggered relation with each other, on one of the longitudinal marginal edges of the card and having indicated thereon, the full amount of the monthly salary, so that when the cards are resting with their opposite longitudinal edges on the bottom 2 of the file case, the tab projects above the body of the cards and acts as the index, whereby the desired salary card can be easily found. These tabs also provide an easy means of tilting or rotating any of the cards, so the contents on its face will be brought into view from its concealed position among the other cards in the case. Each one of these salary cards contains four columns of figures, the first of which, under the heading "No. of days worked" gives the maximum number of working days in a month, excluding Sundays, while the second, third and fourth columns indicate the different corresponding salary amounts for each number of working days in months containing 25, 26 and 27 working days respectively as indicated in the column headings. As illustrated in Fig. 5, this card is indexed and numbered as pertaining to a monthly salary of $50.00. for all the working days in any month being numbered in the first column 17 for ease of reference in this description only, the heading of this column being "No. of days worked" and these are set down from 1 to 27 inclusive, indicating the maximum number of working days that can be worked in any month, excluding Sundays. The second, third and fourth columns marked 18, 19 and 20 under the headings "25 days", "26 days" and "27 days" respectively represent the amount of salary the employee is entitled to receive for each number of working days or fraction of a month in which 25, 26 or 27 working days occur.

My employment card indicated as 21, is illustrated in Fig. 6. It is shown as pertaining to the months of September, October, November and December of the year 1910, and has an index tab 22 for indicating the months for which the card is made. Three cards similar to 21 comprising all the months of a year, are placed at the back of the case behind the salary cards, although cards for more than a year can be in place if desired. On card number 21 the extreme lefthand vertical column 23 headed "Date" is numbered in accordance with the calendar days of the maximum month from 1 to 31 inclusive. The other vertical columns are arranged in groups of two numbers under each month and headed "Came" and "Left". The "Came" column under each month is shown at 24 and the "Left" column as at 25. The numbers of each group are suitably shown to determine on reference the actual number of days that should properly be credited to an employee who "came" to, or "left" the work on any certain dates of that month. The blank spaces in the columns 24 and 25 headed "Came" and "Left" are opposite the numbers of the "Date" column corresponding to the date numbers of days not considered work days, these including Sundays, holidays, etc., as the case may be.

The cards 15 and 21 each has a perforation 26 near one of its corner edges, the said corner edge being beveled or clipped off at an angle of 45 degrees to the sides of the cards, as at 27, or it may be rounded, if desired, the object being to allow the card to swing freely on its pivot without obstruction. The cards 15 and 21 thus constructed with the tabulated information thereon are placed in the file case 1 by unscrewing the retaining rod 7 and passing it through the perforations 26 of the cards. A label card 28 also having a perforation 26 and a clipped corner to register with the tabulated cards is placed in front of the body of the cards 15 and 21 to more readily designate the file.

In order to more fully explain the use and conveniences of my invention, I will assume that it is desired to determine what is due an employee for October, 1910, for services rendered in an employment begun on the 8th of that month, and continuing throughout that month, at a monthly salary of $50.00. To determine the above, the file case with the cards arranged therein and inscribed as illustrated, is referred to, and the proper index tab "September-December" of the employment card 21 is operated with the finger or suitable instrument, toward the open side end of the receptacle. This operation may be either a lifting or a pressing one, and rotates the card about the pivotal retaining rod 7 a quarter of a revolution, or from a longitudinal to an upright or vertical position, where the rotation is checked by the edge of the card meeting the plane of the top surface of the table, or other article of furniture whereon the file case rests. The card illustrated in Fig. 6 is now presented with data exposed to view in an upright position for reading. As, under the assumption, the employment of the employee commenced October 8th, we refer to the employment card 21 under "October" in the column 24 under "Came" to the number on the horizontal line opposite 8th day of the month of the "Date" and find 20 as the number of days worked. We also notice that the maximum number of working days for October as given, is 26 at the top of column headed "Came." Now raising the $50.00 a month salary card 15 to an upright position in the file case, and referring to the card which is substantially the same as that illustrated in Figs. 1 and 5 of the drawings, we find in column 19 under "26 days" on the horizontal line opposite 20 in the "number of days worked" column 17, the amount $38.46, which is the amount of money due the employee for the month of October, 1910 under the conditions stated. If the example assumed that the party employed had been working from October 1st to October 8th, inclusive and left at the close of the day's work on October 8th, the procedure would be similar, using the "Left" column 26 of that month, as shown in Fig. 6, and referring to the foot of the column for the number of working days in the month and then consulting the salary card 15.

Although I have shown and described my invention in considerable detail, I do not wish to limit myself to the exact and specific forms shown and described, but may use such substitutions, modifications or equivalents thereof, as are embraced within the scope of my invention, as set forth in the claims.

What I claim as new and desire to secure by Letters Patent is:—

1. A file case comprising an open top box with an open end, a follower block therein adapted to support cards in a raised position, said follower block being held at one end by a friction member attached thereto and contacting with the inner face of the end of the case, and a retaining rod passing through and adapted to hold the opposite end of the follower block.

2. A card filing case comprising an open top box with an open end, a follower block mounted therein adapted to support the cards on edge, said follower block being held at one end by a friction member attached thereto and contacting with the inner face of the end of the case opposite its open end, and a card retaining rod passing through and securing the other end of the follower block, said retaining rod adapted to pass through a perforation near the corner of the card forming a pivot therefor.

3. A card filing case comprising an open top box with an open end, a follower block mounted therein adapted to support the cards on edge, said follower block being held at one end by a friction member attached thereto and contacting with the inner end of the case opposite its open end, and a card retaining rod passing through and securing the other end of the follower block, said retaining rod also adapted to pass through a perforation in the lower corner of each card near the open end of the file forming a pivot for the card thereby allowing the card to be swung edgewise out through the open end of the file into an upright position for inspection, or for returning it into its original position in the file, substantially as described.

In testimony whereof, I hereto affix my signature in the presence of two witnesses.

WILLIAM H. WALKER.

Witnesses:
J. F. GROGAN,
ROBT. A. BEERS.

---

Copies of this patent may be obtained for five cents each, by addressing the "Commissioner of Patents, Washington, D. C."